Nov. 30, 1954
C. H. SMOOT
2,695,981
FOLLOW-UP TYPE OF MEASURING APPARATUS
Filed Aug. 13, 1949
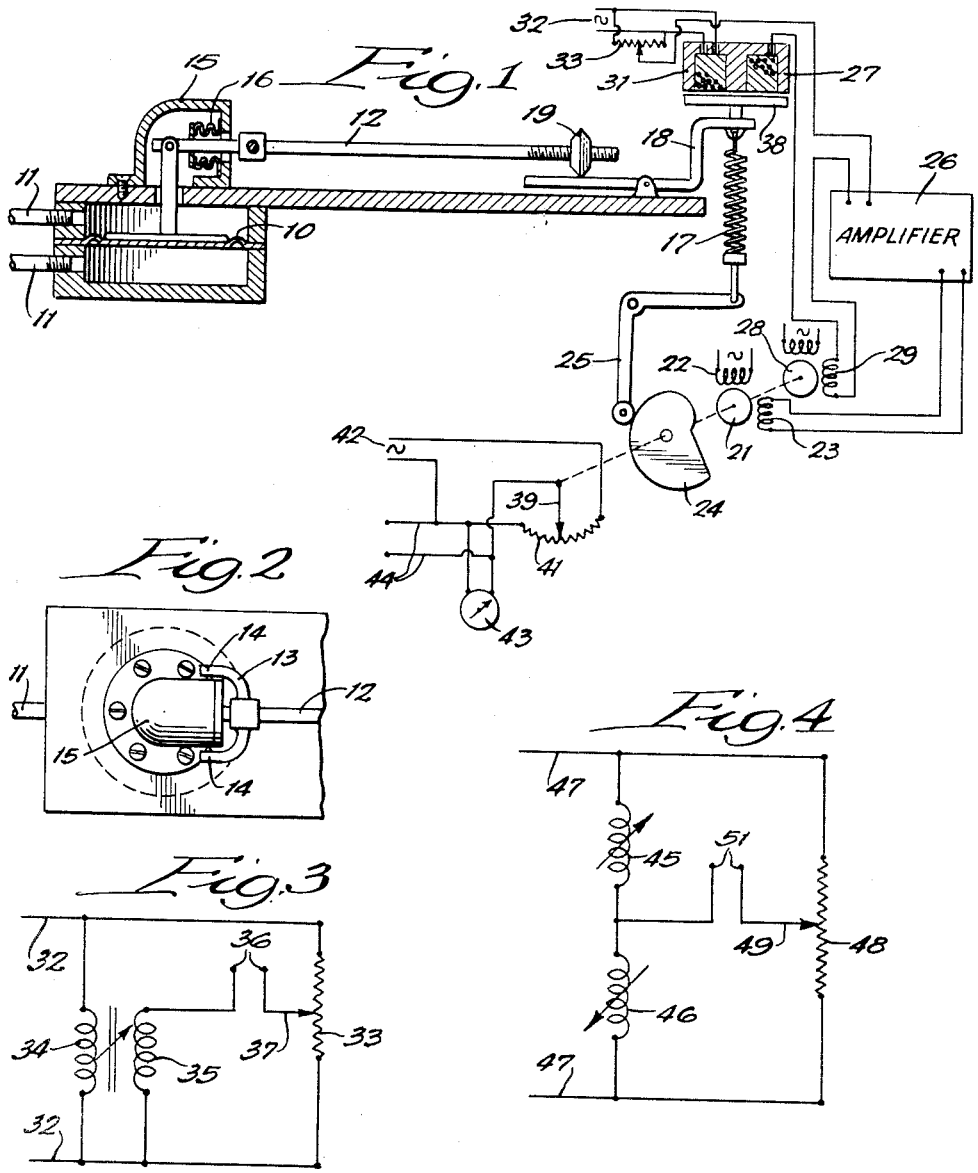
INVENTOR:
Charles H. Smoot,
BY Dawson, Ooms, Booth and Spangenberg
ATTORNEYS.

United States Patent Office 2,695,981
Patented Nov. 30, 1954

2,695,981

FOLLOW-UP TYPE OF MEASURING APPARATUS

Charles H. Smoot, Chicago, Ill., assignor to Republic Flow Meters Company, Chicago, Ill., a corporation of Illinois Application August 13, 1949, Serial No. 110,213

5 Claims. (Cl. 318—32)

This invention relates to measuring apparatus and more particularly to electrical apparatus for electrically measuring variations in a physical condition.

Measuring apparatus as heretofore constructed has generally been of the positioning type in which a movable member is more or less deflected in response to changes in the condition or of the balancing type in which a fluid pressure responsive device is utilized to balance the force exerted by an element sensitive to the condition. The present invention relates to a balancing type apparatus and has for one of its objects the provision of such apparatus in which balance of the sensitive element is effected electrically.

Another object is to provide measuring apparatus in which a reversible motor is controlled by movement of a pivoted beam and adjusts a spring exerting a rebalancing force on the beam.

Still another object is to provide a measuring apparatus in which the motor drives a generator connected in the motor control circuit to prevent over shooting or hunting.

A further object is to provide measuring apparatus in which the movable balance beam controls a variable electric device to vary the voltage or phase in the motor control circuit. According to one feature the electrical device is a variable transformer or impedance unit, and the beam moves an armature toward and away from the unit to vary the flux path therein thereby to control the motor.

The above and other objects and advantages of the invention will be more readily apparent when read in connection with the accompanying drawing, in which—

Figure 1 is a diagrammatic view with parts shown in section of a measuring apparatus embodying the invention;

Figure 2 is a partial plan view of Figure 1; and

Figures 3 and 4 are circuit diagrams of alternative control circuits.

As shown in Figure 1, the apparatus comprises a sensing instrument including a flexible diaphragm 10 adapted to be connected on its opposite sides to sources of differential pressures through conduits 11. The diaphragm is connected to one end of a balance beam 12 which carries a yoke 13 pivoted at 14 to a housing 15 enclosing one surface of the diaphragm. The beam may be sealed in the housing by a flexible bellows 16 in the manner more particularly described and claimed in the patent to Rosenberger No. 2,299,179.

The diaphragm is so arranged that the differential pressure thereon will normally urge the beam to turn clockwise, and a spring 17 is provided to rebalance the beam. As shown, the upper end of the spring is connected to a lever 18 pivoted adjacent the beam and engaging a collar 19 adjustably mounted on the beam. By shifting the collar, the leverage can be changed thereby to adjust the control range of the instrument.

The tension of the spring 17 is adapted to be adjusted by a reversible motor including a rotor 21, a main winding 22, and a control winding 23. The motor, as shown, is of the two phase reversible type and drives a cam 24 engaging one end of a bell crank lever 25 to the opposite end of which the spring 17 is connected. It will be seen that when the spring tension is so adjusted that the force exerted thereby on the beam 12 equals the force exerted by the diaphragm the instrument is in balance.

To control the motor to effect rebalancing of the beam, an amplifier 26 is provided connected to the control winding 23. The amplifier is controlled by a variable electrical device indicated generally at 27 for producing a change in phase of alternating current supplied to the amplifier input so that the phase and amplitude of the current supplied to the control winding 23 will be varied. To prevent overshooting and hunting a generator 28 is provided having an output winding 29 connected in series with the electrical device 27 in such a manner as to be in phase opposition to the output of the electrical device.

The electrical device 27, as shown in Figure 3, may be in the form of a transformer having a three legged core 31 with primary and secondary windings thereon. The primary winding is supplied from an alternating current source 32 across which a resistor 33 is connected. In the circuit, as seen in Figure 3, the transformer primary winding 34 is also connected directly across the source, and the secondary winding 35 has its lower end connected to one of the source leads 32. The output terminals 36 of the device are connected to the upper end of the secondary winding and to a wiper 37 engaging the resistor 33, as shown.

With this circuit when the voltage developed across the secondary winding 35 is equal to the voltage at the wiper 37, there will be no output voltage at the terminals 36 and the motor will be stationary. This is the normal condition of the mechanism and is produced when the coupling between the primary and secondary windings is at the normal value. As the beam moves in response to a change in the condition as reflected by an increase or decrease in the force exerted by the diaphragm 10, it will rock the lever 18 and will move a magnetic armature 38 carried thereby toward or away from the core 31 to change the coupling between the primary and secondary windings and thereby change the voltage developed across the secondary winding. Assuming, for example, that the coupling is increased the voltage at the upper end of the secondary winding will exceed that at the center tap 37 so that the output across the terminals 36 will be in phase with the voltage in the secondary winding to cause the motor to run in one direction. As soon as the motor starts running, a voltage is developed in the generator which is in opposite phase to the control voltage and tends to cancel or at least to reduce the control voltage so that the circuit will reach an apparent balance and will not overshoot. Operation of the motor will also turn the cam to change the tension of the spring 17 to rebalance the beam. The position of the motor on the cam, therefore, becomes an accurate indication of the value of the condition.

To utilize the position of the motor to develop a controlling force, the motor is preferably also connected with a wiper 39 movable across a resistor 41 connected to a current source 42. The voltage developed between the wiper and one end of the resistor may be indicated by a meter 43 to give an indication of the value of the condition and may also be transmitted by leads 44 to a controlling device for effecting a correction in the condition.

Instead of using a transformer with variable coupling, as shown in Figure 3, the control circuit may be constructed as shown in Figure 4. In this circuit a pair of variable inductances 45 and 46 are connected in series across a source 47. A resistor 48 is connected across the same source and has a wiper 49 adjustable therealong. The output terminals 51 may be connected to the wiper and to the mid-point between the inductances. The inductances are so arranged that upon movement of the armature 38 the impedances of one will increase and of the other will decrease. Thus the voltage at the left terminal 51 approaches more nearly that of one or the other of the leads 47 so that the effective phase and voltage across the terminals 51 will be shifted. It will be noted that with both circuits there are no mechanically engaged parts to be moved so that friction does not present a problem and that an extremely accurate and rapid control is obtained which will at all times bring the apparatus back to a condition of balance with the beam in the same neutral position without overshooting or hunting.

While two embodiments of the invention have been shown and described in detail herein, it will be understood that they are illustrative only and are not to be taken as a definition of the scope of the invention, reference being had for this purpose to the appended claims.

What is claimed is:

1. Measuring apparatus comprising a pivoted beam, means responsive to a condition to be measured connected to the beam and exerting a force thereon proportional to the value of the condition to urge the beam in one direction, a spring connected to the beam and exerting a force thereon urging it in the other direction, a reversible alternating current motor having a control winding to reverse the direction of motor operation as the phase of the current supplied to the control winding is reversed, means connecting the motor to the spring to adjust the spring tension, an alternating current circuit connected to the motor control winding, a phase reversing device in the circuit connected to the beam to reverse the phase of current in the circuit as the beam moves one way or the other from its normal balanced position, the phase reversing device including a pair of windings at least one of which is connected in said circuit and a magnetic armature movable relative to the windings to vary the electrical characteristics thereof and a generator driven by the motor and connected in the circuit in phase opposing relationship to said device.

2. Measuring apparatus comprising a pivoted beam, means responsive to a condition to be measured connected to the beam and exerting a force thereon proportional to the value of the condition to urge the beam in one direction, a spring connected to the beam and exerting a force thereon urging it in the other direction, a reversible alternating current motor having a control winding to reverse the direction of motor operation as the phase of the current supplied to the control winding is reversed, means connecting the motor to the spring to adjust the spring tension, an alternating current circuit connected to the motor control winding, a variable impedance device in the circuit connected to the beam to be varied thereby to reverse the phase of the current in the control circuit as the beam moves one way or the other from its normal balanced position, the phase reversing device including a pair of windings at least one of which is connected in said circuit and a magnetic armature movable relative to the windings to vary the electrical characteristics thereof and an alternating current generator driven by the motor and connected in the circuit in phase opposing relation to the impedance device.

3. Measuring apparatus comprising a pivoted beam, means responsive to a condition to be measured to urge the beam in one direction, a spring connected to the beam to urge it in the other direction, a reversible alternating current motor having a control winding to reverse the direction of motor operation as the phase of the current supplied to the control winding is reversed, means connecting the motor to the spring to adjust the spring tension, an alternating current circuit connected to the motor control winding, a transformer having a primary winding and a secondary winding, a source of reference voltage, said source and one end of the secondary winding being connected to the circuit, a magnetic armature moved by the beam toward and away from the transformer to vary the coupling between the windings, and a generator driven by the motor and connected in the circuit in phase opposing relationship to the transformer.

4. Measuring apparatus comprising a pivoted beam, means responsive to a condition to be measured connected to the beam and exerting a force thereon proportional to the value of the condition to urge the beam in one direction, a spring connected to the beam and exerting a force thereon urging it in the other direction, a versible alternating current motor having a control winding to reverse the direction of motor operation as the phase of the current supplied to the control winding is reversed, means connecting the motor to the spring to adjust the spring tension, an alternating current circuit connected to the motor control winding, a pair of variable impedances connected in series, a source of reference voltage, the source and the mid-point between the impedances being connected in the circuit, means operated by movement of the beam to vary the impedances oppositely, and a generator driven by the motor and connected in the circuit in phase opposing relationship to the voltage therein.

5. Measuring apparatus comprising a beam pivoted intermediate its ends, means responsive to a condition to be measured connected to one end of the beam to exert a force on the beam proportional to the value of the condition urging the beam in one direction, a lever pivoted adjacent to the other end of the beam and having an end portion lying adjacent and parallel to the beam, a collar adjustable longitudinally of the beam and lever and operatively connecting them, a spring connected to the lever urging it in a direction such as to exert a force on the beam to balance the force exerted by the responsive means on the beam, a reversible motor connected to the spring to vary its tension, and control means for the motor responsive to movement of the beam.

References Cited in the file of this patent

UNITED STATES PATENTS

| Number | Name | Date |
| --- | --- | --- |
| 700,111 | Arcioni | May 13, 1902 |
| 860,572 | Routin | July 16, 1907 |
| 1,497,401 | Boddie | June 10, 1924 |
| 1,668,353 | Brooke, Jr. | May 1, 1928 |
| 2,115,086 | Riggs | Apr. 26, 1938 |
| 2,125,949 | O'Conner | Aug. 9, 1938 |
| 2,347,590 | Binder | Apr. 25, 1944 |
| 2,371,236 | Gille et al. | Mar. 13, 1945 |
| 2,484,541 | Allwein | Oct. 11, 1949 |
| 2,546,657 | Smoot | Mar. 27, 1951 |
| 2,568,586 | Hunt et al. | Sept. 18, 1951 |
| 2,592,088 | Wannamaker et al. | Apr. 18, 1952 |
| 2,599,288 | Schaefer | June 3, 1952 |
| 2,611,812 | Hornfeck | Sept. 23, 1952 |

OTHER REFERENCES

Servomechanism Fundamentals, Lauer, Lesnick, and Matson, McGraw-Hill Book Co., 1947.

Analysis and Design of Translator Chains by Ziebolz, vol. 1, pp. 80, 81, vol. 2, Fig. 97.